T. E. CRECELIUS.
WELDING MACHINE.
APPLICATION FILED APR. 24, 1912.
1,076,271.                                     Patented Oct. 21, 1913.
4 SHEETS—SHEET 4.
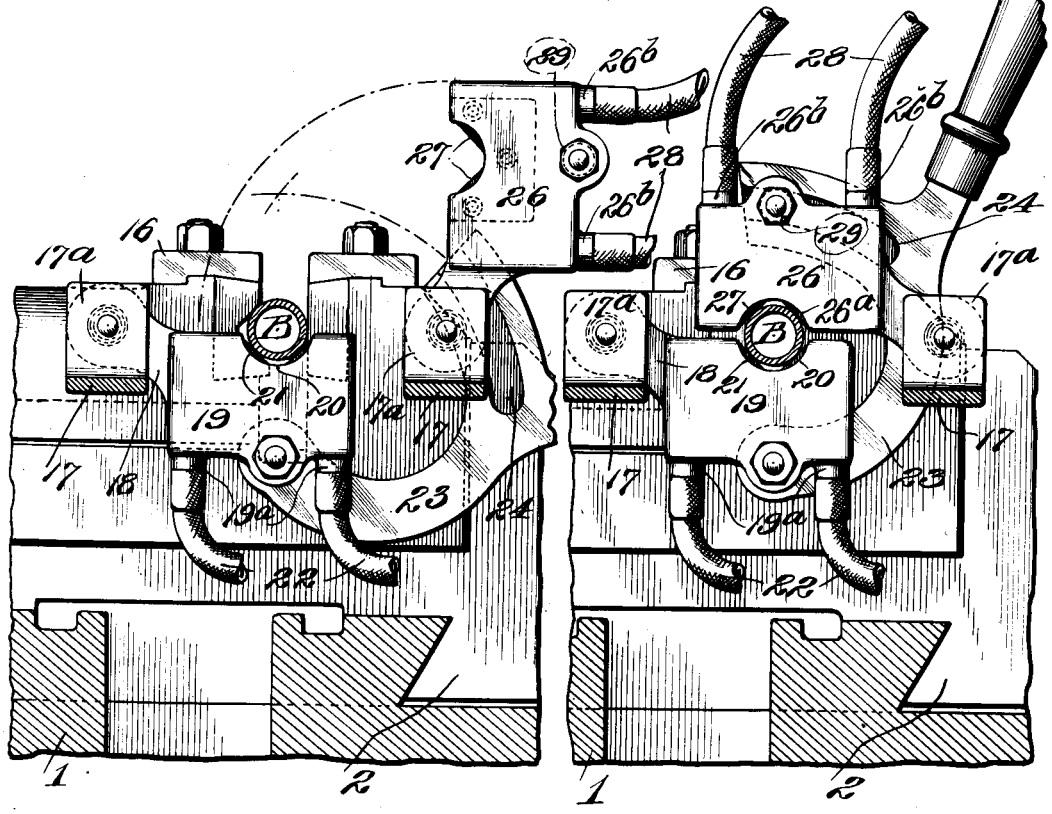
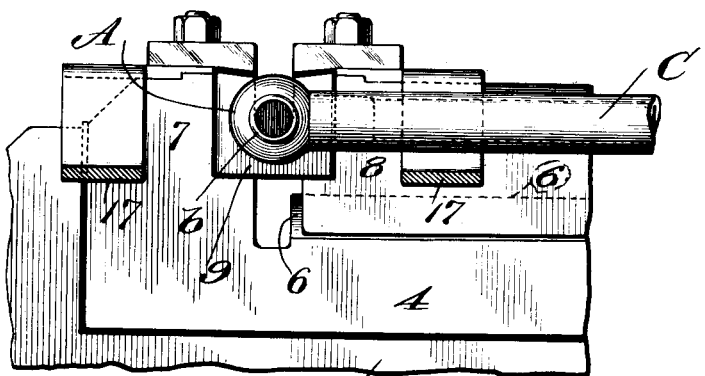

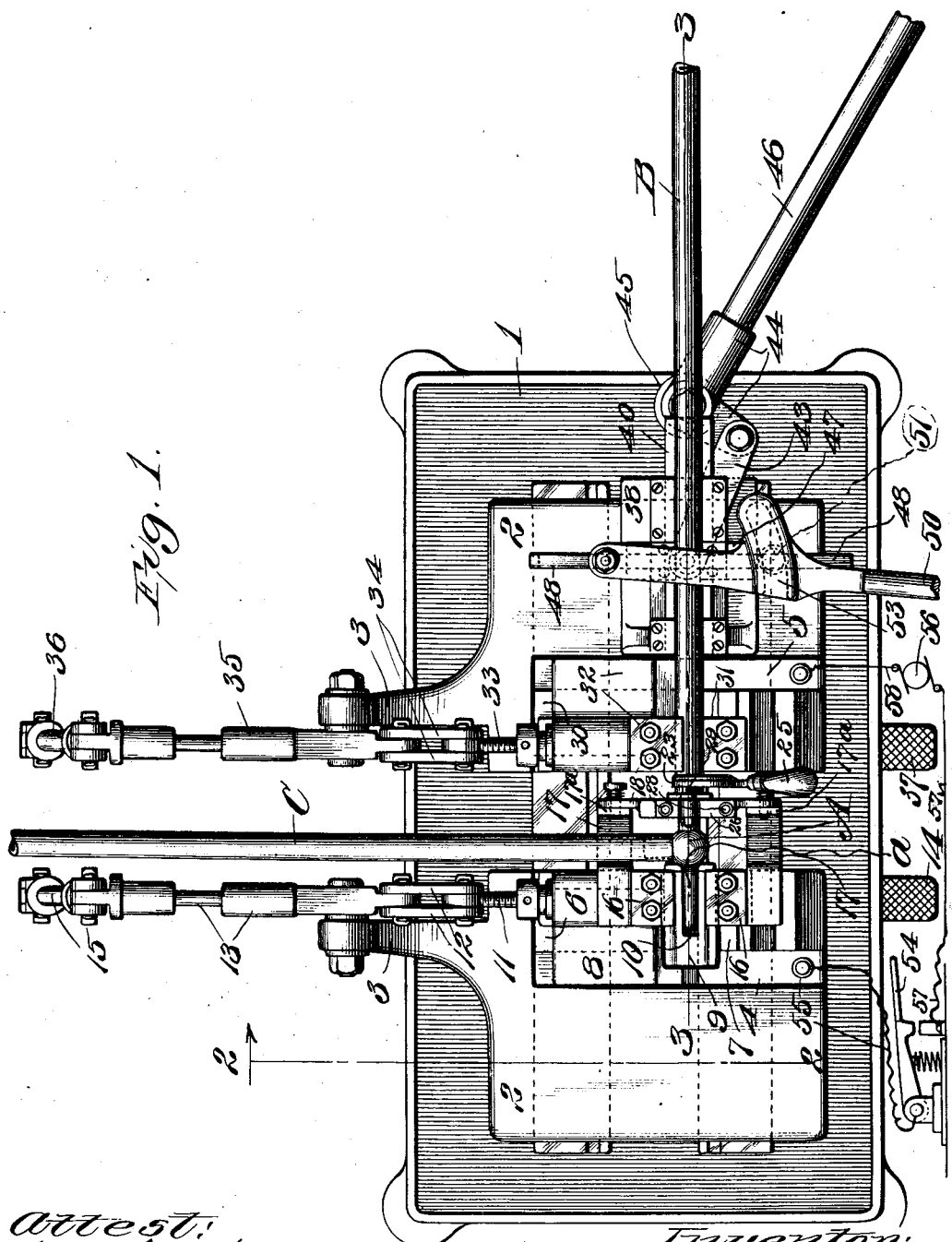

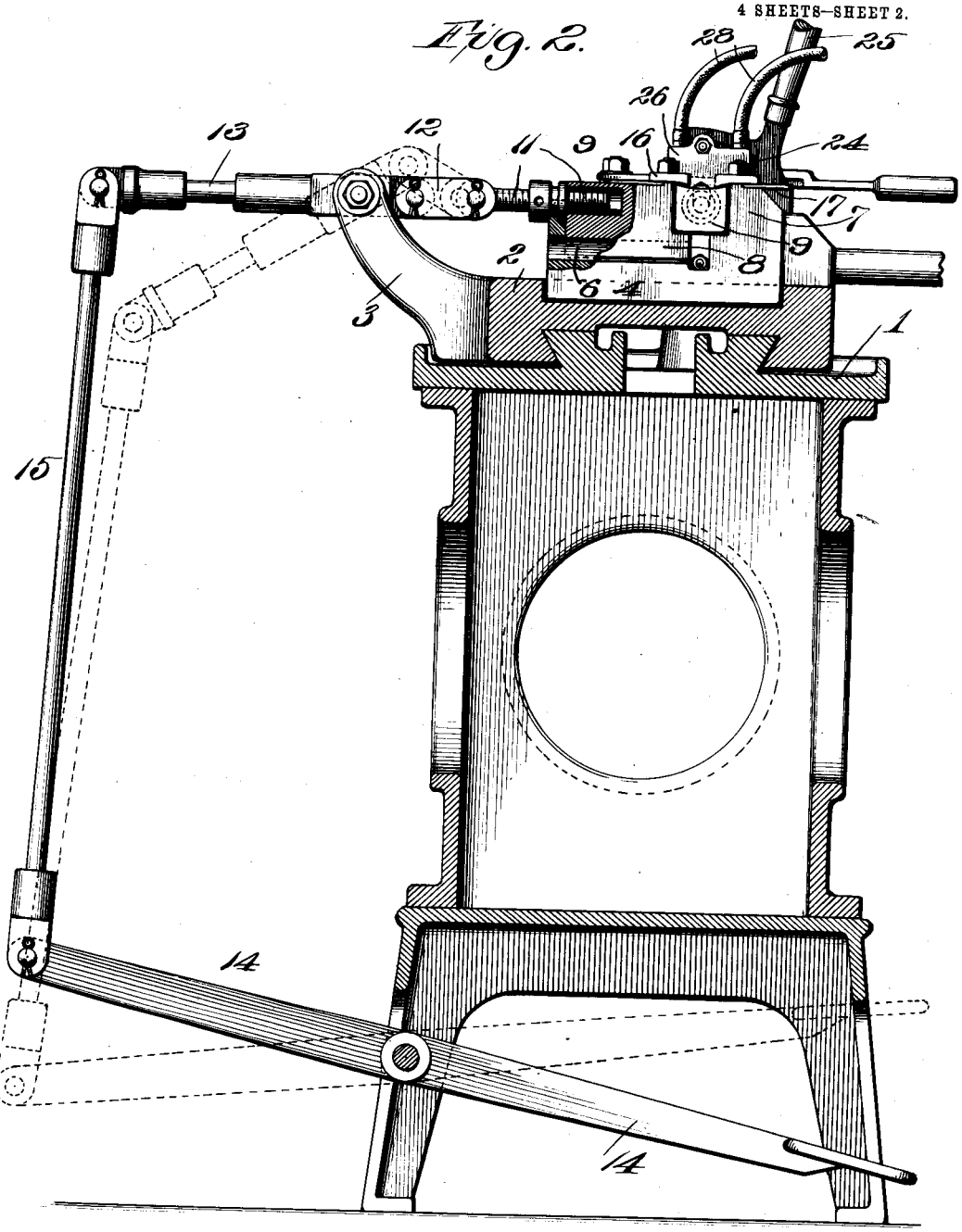

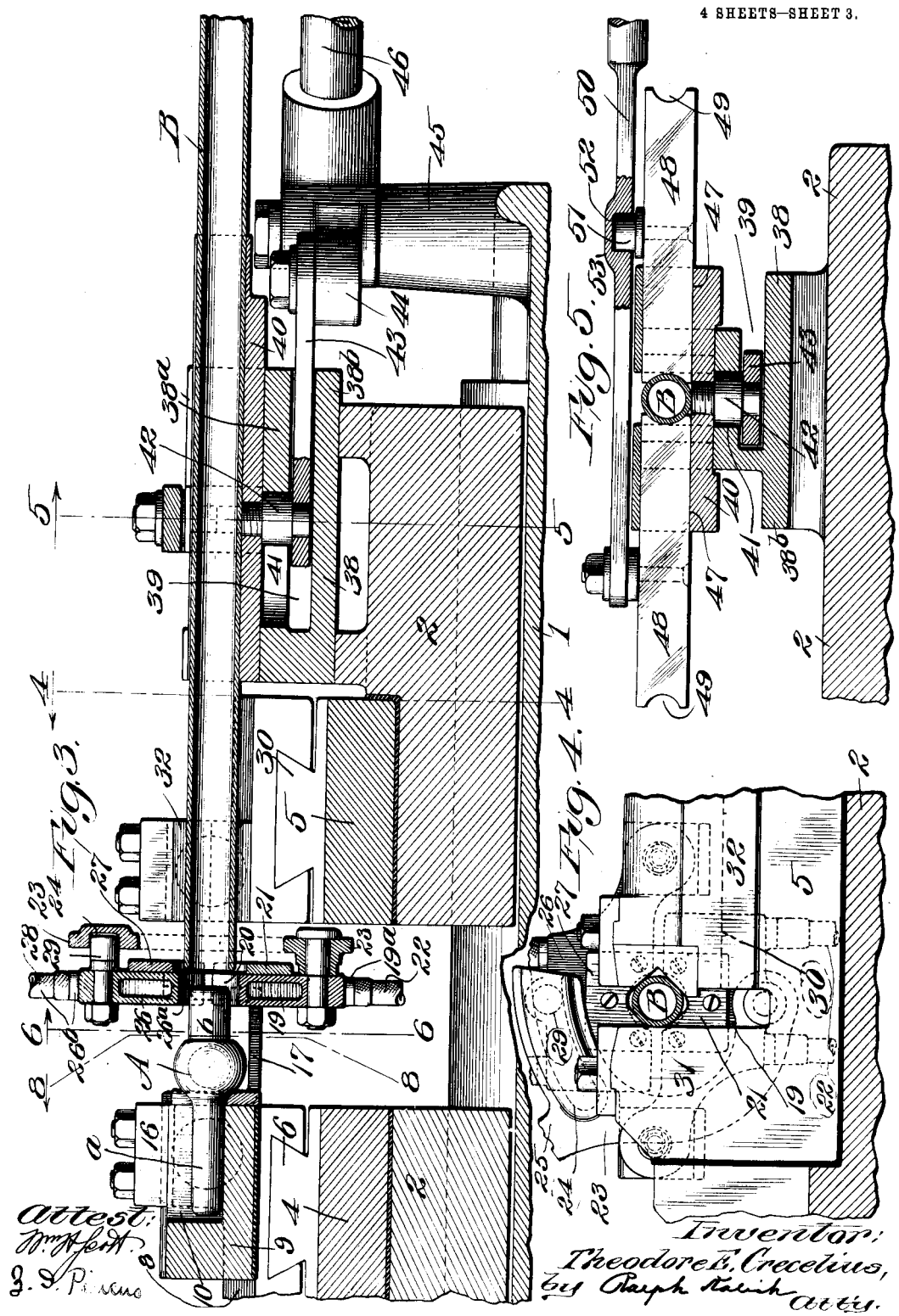

UNITED STATES PATENT OFFICE.

THEODORE E. CRECELIUS, OF ST. LOUIS, MISSOURI, ASSIGNOR TO MULTIPLEX DISPLAY FIXTURE COMPANY, OF ST. LOUIS, MISSOURI, A CORPORATION OF MISSOURI.

WELDING-MACHINE.

1,076,271. Specification of Letters Patent. Patented Oct. 21, 1913.

Application filed April 24, 1912. Serial No. 692,947.

*To all whom it may concern:*

Be it known that I, THEODORE E. CRECELIUS, a citizen of the United States, residing at the city of St. Louis, State of Missouri, have invented certain new and useful Improvements in Welding-Machines, of which the following is a specification, reference being had to the accompanying drawings, forming a part hereof, in which—

Figure 1 is a plan view of a welding-machine embodying my invention; Fig. 2 is a sectional view taken approximately on the line 2—2, Fig. 1; Fig. 3 is an enlarged detail section taken approximately on the line 3—3, Fig. 1; Fig. 4 is a detail section taken on the line 4—4, Fig. 3, looking in the direction of the arrow; Fig. 5 is a detail section taken on the line 5—5, Fig. 3, looking in the direction of the arrow; Fig. 6 is a detail section taken approximately on the line 6—6, Fig. 3, and showing the upper one of the pipe contact-members or jaws in elevated or open position; Fig. 7 is a detail section similar to Fig. 6, showing said upper one of the pipe contact-members or jaws in lowered or closed position; and Fig. 8 is a detail section taken approximately on the line 8—8, Fig. 3.

This invention relates generally to certain new and useful improvements in electric welding-machines, and more particularly to a new and useful machine especially designed and adapted for rigidly and firmly uniting or securing together the adjacent ends of sections of metallic pipes or tubing.

My new welding-machine is particularly designed and adapted, and has heretofore been used by me, for uniting or securing together sections of metallic pipes or tubing into the form of rectangular frames for wings or leaves for display-racks, such as shown and described in application of Louis Feldmann, Jr., and myself for Letters Patent for wings or leaves for display-racks, filed April 6, 1912, and serially numbered 689,027, and will be herein described in that connection, but it will be understood that the same machine can be equally well and advantageously employed for welding joints between any cylindrical or tubular sections of metal or the like and uniting or securing the same together into other forms and for other purposes or uses.

In the formation or manufacture of rectangular frames composed of metallic tubing, and particularly those frames used in or as the swingable leaves or wings of display-racks, it has heretofore been, and is now generally, the practice to employ or utilize metallic elbows or angle-pieces at the corners, and for uniting or securing together the metallic tube sections, of the frame, the legs of the elbow or angle piece being forced while cold into, and thus seated in, the adjacent ends of the tube sections. This practice, however, is troublesome, unsatisfactory, and slow, and not only has considerable difficulty been experienced in so forming strong, durable and substantial joints between the sections, but also considerable loss to the manufacturer has been occasioned by the tubular sections splitting or fracturing endwise on the forcing therein of the legs of the elbows or angle-pieces and thus becoming or being rendered unfit for service or use.

It is the purpose and object of my invention to overcome or obviate the objectionable features just mentioned and to provide a machine or apparatus especially adapted to quickly and easily, rigidly, firmly, and substantially secure or unite together such elbows or joint-members and tube sections, any liability of, and consequent losses or increased expense due to, the tube sections splitting or fracturing on being united with the joint-members being done away with.

According to my invention and practice, the tube section is first electrically heated at its end in order to soften and expand such end; the tube section is then moved to force the end so softened and expanded onto and around one of the legs of the joint-member; and afterward the end of the tube section is more or less rapidly cooled, when, as will be clear, it contracts and shrinks around and thus becomes rigidly fixed upon the inclosed or encircled leg of the joint-member; and with the foregoing object in view, my invention resides particularly in the provision of an easily operated machine or apparatus of means adapted to hold the joint-member or elbow and tube section to be united in proper relation one to the other; in the provision in such machine or apparatus of means whereby an electric current is caused to pass through and heat, and thereby soften to the required degree and thus expand, the end of the tube section; in the provision in such machine or apparatus of means adapted to grip the tube section and shift the same relatively to the joint-member to force the end thereof so softened and expanded onto and around one of the legs of the joint-member; and in the novel construction of the several parts of my new machine or apparatus and in the novel arrangement and combination of the same, all as will hereinafter be described and afterward pointed out in the claims.

In the drawings, 1 designates a suitable table or supporting frame, and mounted on said table is a pair of plates 2, each of which is provided with a rearwardly projecting bracket 3. Plates 2 are normally spaced some distance horizontally apart, and fixedly arranged on said plates at their adjacent edges and insulated therefrom are preferably copper blocks 4 and 5.

Formed on block 4 is an integral portion or block 6, and projecting upwardly from the front portion of block 6 is a preferably integral jaw 7. Arranged to slide upon the rear portion of block 6 and opposing and adapted to coöperate with said jaw 7 is a block or jaw 8 likewise preferably of copper. Positioned between and preferably insulated from jaws 7 and 8, and adapted to be clamped in position thereby, is a block 9, in the top of which is a suitable recess 10 adapted to form a pocket or seat for an extension $a$ of the metallic elbow or angle-piece or bar member A employed to provide the joint-member between the elongated hollow metallic members or tube sections B and C. Adjustably connected at one end to block or jaw 8, as shown particularly in Fig. 2, is a screw rod 11, the opposite or other end thereof being connected by a pair of toggle links 12 to the forward end of a lever 13 fulcrumed on the corresponding one of the brackets 3. Pivotally mounted in the lower part of the frame or table 1 is a suitable foot-lever 14, and pivotally connected to the rear ends of levers 13 and 14 is a connecting-rod 15. Keepers in the form of plates 16 are mounted upon and fixed to jaws 7 and 8 and overlie the edges of said block 9 when said jaws 7 and 8 are in closed or clamping position; and clamped between said keepers and said jaws are the ends of elongated plates 17 that extend downwardly along the inner side of their respective jaws 7 and 8 and thence outwardly therefrom, each of said plates being preferably bent or flanged upwardly at its outer end, as at $17^a$. Pivotally connected to portion $17^a$ of the rear one of said plates 17 by means of a short arm 18 is a hollow block 19 that forms the lower one of the pipe contact-members of my machine. Formed in the top of this block is a notch or groove 20, and applied to and secured on the outer face of said block 19 and partially overlying said notch is a recessed contact plate 21. A pair of short tubes $19^a$ project from the bottom of hollow block 19, as shown particularly in Fig. 6, and connected thereto are the ends of flexible tubes 22 communicating with a source of cooling fluid supply, and thus means is provided for maintaining a circulation of cooling fluid through said hollow block 19 for well-understood purposes. Pivotally connected to the lower portion of the block 19 is the rear end of a curved lever 23 provided in its other or upper end with an open-ended eccentric groove 24, and projecting forwardly from this lever 23 is a suitable operating-handle 25.

Pivotally connected to portion $17^a$ of the front one of said plates 17 is a pipe contact-member or hollow block 26 practically the counterpart of, and adapted to coöperate with, said block 19, said block 26 being notched on its under side, as at $26^a$, and carrying on its outer face a contact plate 27 that coincides with said contact plate 21 of block 19. Projecting from the top of block 26 is a similar pair of short tubes $26^b$, to which are connected flexible tubes 28 likewise communicating with a source of cooling fluid supply and thereby similarly providing means for maintaining a circulation of cooling fluid through said hollow block 26. Projecting from the outer face of block 26 is a suitable pin carrying a roller 29 which is adapted to fit and engage in the groove 24 of lever 23 when block 26 is swung downwardly into closed or contacting position, as shown in Fig. 7, and handle 25 is swung rearwardly.

Formed on the block 5 is an integral portion or block 30 and projecting upwardly from the forward end of this block is a jaw 31. Arranged to slide on the rear portion of this block 30 is a jaw 32 that opposes and coöperates with jaw 31, and connected to the rear portion of this sliding jaw 32 is one end of an adjustable screw-rod 33. The other or rear end of rod 33 is connected by toggle-links 34 to the forward end of a lever 35 fulcrumed on the corresponding one of said brackets 3. Pivotally connected to the rear end of lever 35 is the upper end of a rod 36, the lower end of which is pivotally connected to the rear end of a foot-lever 37 fulcrumed preferably adjacent foot-lever 14 on the lower portion of frame or table 1.

The means for supporting and holding or gripping the section of tubing B and moving the said lengthwise to position its open end upon and around the portion $b$ of joint-member A comprises a block 38 arranged and mounted on the plate 2 which carries block 5, an elongated longitudinal slot 39 dividing said block 38 into upper and lower portions $38^a$ and $38^b$, respectively. Arranged for sliding movement on block 38, and in proper alinement and on substantially the same horizontal plane with block 9, is a preferably channel-shaped member or plate 40 having its flanges presented upwardly and in which is adapted to be seated and held the section of pipe or tubing B; and seated in the underside of plate 40, and projecting downwardly through a slot 41 in the upper portion 38ª of block 38 is a pin 42 preferably centrally enlarged, as shown particularly in Fig. 3. Pivotally connected to the lower end of pin 42 is one end of a link 43 adapted to move and operate in said slot 39, the outer end of this link 43 being pivotally connected to one arm of a suitable bell-crank lever 44 fulcrumed on a bracket 45 projecting upwardly from table 1. Projecting outwardly from the other arm of bell-crank 44 is a suitable hand lever 46. Arranged preferably at the center of plate 40 and operating through and slidable in suitable bearings 47 thereon, is a pair of oppositely-disposed jaws 48, the ends of which are preferably concaved, as at 49, to conform to the shape of section of pipe or tubing B. Pivotally mounted on one of these jaws 48 is one end of a hand lever 50, and located on the opposite jaw is a roller 51 adapted to fit and engage in an eccentric groove 52 formed in the under side of an arcuate plate 53 integral with or otherwise suitably connected to hand lever 50. These jaws 48, it might be here stated, are preferably reversible in their bearings 47 and at one end are cut away or concaved to a greater degree than at the other, in order to accommodate and clamp therebetween in channel 40 sections of tubing B of different diameter.

Located at any suitable point, and preferably at a convenient point on the floor adjacent the forward ends of levers 14 and 37, is a suitable electric switch 54 normally held open by spring pressure as shown, and leading from one side of said switch to the block 6 is a suitable conductor 55. Leading from the opposite side of said switch to a suitable generator 56 is a conductor 57, and leading from the other side of the generator 56 to block 5 is a suitable conductor 58.

The operation of my machine is as follows: Block 9 being clamped in position between jaws 7 and 8, the extension a of an elbow or other metallic joint or bar member A is loosely seated in the recess or groove 10 thereof. The clamping of block 9 between its jaws 7 and 8 is accomplished, as will be clear, by depressing lever 14, which movement elevates rod 15 and swings lever 13 on its fulcrum, the rear ends of toggle-links 12 being thereby swung or pulled downwardly and rod 11 forced forwardly. And it might be here stated that normally lever 14 is maintained or held in such depressed or lowered position, the overlying oblique under faces of keepers 16 engaging with block 9 and assisting to that end. Presuming jaws 48 to be in open position and upper pipe-contact member 26 to be in raised or open position, as shown in Fig. 6, a section of pipe or tubing B is positioned in channel-plate 40 and between jaws 31 and 32, the left hand end of tube B resting upon and contacting with contact-plate or portion 21 of block 19 and being immediately adjacent and in proper alinement with projecting leg b of joint-member A. The operator now depresses lever 37, whereby jaw 32, through its described connections therewith, will be moved toward jaw 31 and pipe B firmly clamped and held therebetween. The handle 50 is now drawn around toward the left, thereby engaging roller 51 in said groove 52, and owing to the shape of said groove, jaws 48 will be drawn toward each other, thereby firmly clamping the body of the pipe or tube B to and within channel 40. Block or contact-member 26 is now swung rearwardly and downwardly into the position shown in Fig. 7, and with the parts thus arranged, the plates 21 and 27 contact with the end of the pipe or tube B. The handle 25 is now pulled upwardly, thereby engaging the roller 29 in the groove 24, and owing to the eccentricity of said groove, said blocks or contact-members 19 and 26 will be drawn toward each other and plates 21 and 27 held in firm and positive contact with tube or pipe B. As shown particularly in Fig. 1, it will be noted that small coiled springs 17ᵇ are suitably arranged and interposed on the pivots of contact-members 19 and 26, so as to insure a good electrical contact between said members and their supporting plates 17. The operator now closes the electric circuit by depressing or operating switch 54, when current from the generator passes through conductor 58 into the copper block 30 and jaw 31, thence through the end of pipe or tube B, through contact plates 21 and 27 and their supporting members 19 and 26, then through plates 17 to copper block 6 and its jaw 7, and from thence through conductor 55, switch 54, and conductor 57, back to the generator 56. It might be here stated that block 9 for holding the joint or bar member A in this operation is preferably separate and insulated from block 6 so as to prevent the joint or bar member A receiving or being in any way affected by the electric current flowing through jaw 7 and block 6. The electric current passing through the end of pipe or tubing B quickly heats and softens the same to the required degree, and as soon as this is accomplished, the switch 54 is permitted to open and the foot-pressure upon lever 37 is removed to permit jaw 32 to draw away from and release the tube or pipe B. The handle 25 is now drawn downward to release roller 29 from groove 24 after which the upper contact-member 26 is raised or opened into the position thereof shown in Fig. 6. The handle 46 is now engaged and swung around toward the left hand, thereby actuating the bell-crank 44 and moving the link 43 toward the left in slot 39. Channel 40, being connected to link 43 by means of said pin 42, is also moved toward the left upon the block 38, the enlarged portion of pin 42 operating or moving in said slot 41, and pipe B clamped between the jaws 48 mounted on channel 40 is likewise moved, and the left-hand end thereof, which has been so heated and softened, is forced onto and around the projecting leg $b$ of elbow or joint-member A. Handle or lever 50 is now swung toward the right to disengage roller 51 from groove 52, thereby permitting jaws 48 to be moved apart, and pipe section B with its joint-member A removed from the machine. As the heated end of pipe B now cools off, it shrinks and contracts upon the leg $b$ of elbow or joint-member A and becomes firmly and rigidly fixed or united thereto.

The operations just described are repeated for each joint between the sections of tubing and the joint-pieces or elbows, and by such operations strong, rigid, and substantially unitary frames having solid and substantial joints are quickly and economically produced.

I might here add that in connection with my new welding machine I have heretofore used and employed an assembling table such as is shown and described in United States Letters Patent No. 1,060,430, issued to me April 29, 1913. Now, in Fig. 1, tube member C is shown united to the other leg or member of elbow A. In the operation of forcing tube C upon the other leg of elbow A, it might be here stated that block 9 is not generally employed. In such operation, the tube B with leg $b$ of elbow A united thereto as described is placed and suitably supported in the machine by means of said work-table in the position in which the tube C is shown in Fig. 1, with the opposite or free leg of the joint member presented toward block 30 and jaws 31 and 32. The tube C, being now clamped in member 40, is forced upon the projecting or free leg of elbow A in a manner similar to that in which tube B was forced upon leg $b$ of elbow A as described. It will be noted that contact members 19 and 26 are sufficiently removed inwardly from jaws 7 and 8 by means of the bent plates 17 to accommodate tube B in this operation.

By utilizing a machine of my improved construction, the frames turned out or produced are uniform in size and appearance and the losses in the manufacture of such frames are reduced to a minimum, inasmuch as there is no danger of splitting or fracturing the ends of the tubes while the same are being forced onto the joint-pieces, the tubes being heated to such a degree as to be extremely ductile.

It will be readily understood that my new machine can be advantageously employed wherever it is desirable to form strong, rigid joints between the adjacent ends of tube sections and joint-members.

I am aware that minor changes in the size, form, arrangement, construction, and combination of the several parts of my new machine may be made and substituted for those herein shown and described without departing from the nature and principle of my invention.

Having thus described my invention, what I claim and desire to secure by Letters Patent is:

1. In a machine of the class described, the combination with a supporting frame, of insulated means on said frame for lengthwise holding a metallic bar-member in fixed position thereon, movable means shiftable on said frame adapted to support and hold an elongated hollow metallic member in longitudinal alinement with, and with one end thereof in operative position relatively to, said bar-member, means for heating only said end of said hollow member to soften the same, and means on said frame adapted to shift said movable means with its carried hollow member toward said bar-member to position the softened end of said hollow member upon and around said bar-member; substantially as described.

2. In a machine of the class described, the combination with a supporting-frame, of insulated means on said frame for lengthwise holding a metallic bar-member in fixed position thereon, movable means shiftable on said frame adapted to support and hold an elongated hollow metallic member in longitudinal alinement with, and with one end thereof in operative position relatively to, said bar-member, means for causing an electric current to pass only through said end of said hollow member to heat and thereby soften the same, and means on said frame and engaging said movable means adapted to shift the same with its carried hollow member toward said bar-member to position the softened end of said hollow member upon and around said bar-member; substantially as described.

3. In a machine of the class described, the combination with a supporting-frame, of insulated means on said frame for lengthwise holding a metallic bar-member in fixed position thereon, movable means shiftable on said frame adapted to support and hold an elongated hollow metallic member in longitudinal alinement with, and with one end thereof in operative position relatively to, said bar-member, a plurality of sets of contact members on said frame, said contact-members being included in an electric circuit and being adapted to electrically contact and engage with said hollow member only at said end to cause an electric current to pass through and heat and thereby soften the same, and means on said frame and engaging said movable means adapted to shift the same with its carried hollow member toward said bar-member to position the heated and softened end of said hollow member upon and around said bar-member; substantially as described.

4. In a machine of the class described, the combination with a supporting frame, of insulated means on said frame for lengthwise holding a metallic bar-member in fixed position on said frame, movable means shiftable on said frame adapted to support and hold an elongated hollow metallic member in longitudinal alinement with, and with one end thereof in operative position relatively to, said bar-member, a pair of contact jaws on said frame, said jaws being included in an electric circuit and being adapted to releasably grip and electrically engage with said hollow member at said end thereof, a pair of coöperating contact-members on said frame also included in said circuit and adapted to removably electrically contact and engage with said hollow member at said end thereof, the circuit between said jaws and contact-members being completed through said hollow member at said end and said end thereof only being heated and softened by the electric current passing therethrough, and means on said frame and engaging said movable member adapted to shift the same with its carried hollow member toward said bar-member to position the heated and softened end of said hollow member upon and around said bar-member; substantially as described.

5. In a machine of the class described, a supporting frame, a longitudinally-slotted block on said frame, tube-supporting means slidable on said block, and means comprising a bell-crank lever pivotally mounted on said frame and a link pivotally connected to said bell-crank lever and to said supporting means and movable in the slot of said block adapted to slidably move said supporting means on said block; substantially as described.

6. In a machine of the class described, a supporting frame, a block comprising upper and lower spaced apart members on said frame, a metallic tube-supporting member slidably mounted on the upper member of said block, and means comprising a bell-crank lever pivotally mounted on said frame and a link pivotally connected to said lever and to said supporting member and operable in the space between said upper and lower members of said block adapted to slidably move said supporting member on said block; substantially as described.

7. In a machine of the class described, a supporting frame, a block comprising upper and lower spaced apart members on said frame, the upper member of said block being provided with a longitudinally-disposed slot, a tube-supporting member mounted on the upper member of said block and provided with a depending portion movable in said slot thereof, and means comprising a bell-crank lever pivotally mounted on said frame and a link pivotally connected to said bell-crank lever and to said depending portion of said supporting member and movable in the space between the upper and lower members of said block adapted to move said supporting member on said block; substantially as described.

8. In a machine of the class described, the combination with a supporting frame, of metallic-section holding means on said frame, a contact member mounted on said frame, and a second contact member pivotally swingable on said frame and adapted to coöperate with said first contact member, said contact members being included in an electric circuit and being adapted to electrically contact with the metallic section held by said holding means; substantially as described.

9. In a machine of the class described, the combination with a supporting frame, of metallic section holding means on said frame, and a pair of coöperating contact-members pivotally swingable on said frame, said contact-members being included in an electric circuit and being adapted to electrically contact with the metallic section held by said holding means; substantially as described.

10. In a machine of the class described, the combination with a supporting frame, of metallic section holding means on said frame, a pair of coöperating contact-members pivotally arranged on said frame, said contact-members being included in an electric circuit and being adapted to electrically contact with the metallic section held by said holding means, and means carried by said contact members adapted to releasably lock the same in electrical engagement with said metallic section; substantially as described.

11. In a machine of the class described, the combination with a supporting frame, of metallic section holding means on said frame, a pair of coöperating contact-members pivotally arranged on said frame, said contact-members being included in an electric circuit and being adapted to electrically contact with the metallic section held by said holding means, and means carried by said contact members adapted to releasably lock the same together and in electrical engagement with said metallic section; substantially as described.

12. In a machine of the class described, a pair of coöperating movable contact members included in an electric circuit and adapted to electrically engage with a metallic section and means comprising a curved lever pivotally mounted on one of said members and provided on one side with an eccentric groove and a roller mounted on the other of said members and adapted to fit in and be engaged by said groove adapted to releasably lock said members together in electrical engagement with said metallic section; substantially as described.

13. In a machine of the class described, the combination with a support, of a pair of elongated plates secured thereto and extending outwardly therefrom, a pair of coöperating contact members pivotally mounted on said plates and included in an electric circuit, said contact members being adapted to electrically engage with a metallic section, and means comprising a curved lever pivotally mounted on one of said members and provided with an eccentric groove and a roller mounted on the other of said members adapted to fit in and be engaged by said groove adapted to releasably lock said contact members together and in electrical engagement with said metallic section; substantially as described.

14. In a machine of the class described, a pair of coöperating pivotally swingable fluid cooled heads and contact members carried by said heads and included in an electric circuit, said contact members being adapted to electrically engage with a section of metallic tubing; substantially as described.

15. In a machine of the class described, the combination with a fixed supporting frame, of a pair of contact jaws on said frame and included in an electric circuit, means on said frame adapted to hold a metallic section in fixed position relatively to said jaws, said jaws being adapted to electrically engage with the metallic section held by said holding means and one of said jaws being movable relatively to and toward the other jaw, and means on said frame adapted to actuate said movable jaw; substantially as described.

16. In a machine of the class described, the combination with a fixed supporting frame, of means on said frame adapted to hold a metallic section in fixed position relatively to said jaws, a fixed contact jaw on said frame, a movable jaw shiftable on said frame toward, and adapted to coöperate with, said fixed jaw, said jaws being included in an electric circuit and being adapted to electrically engage with the metallic section held by said holding means, and means on said frame adapted to shiftably actuate said movable jaw; substantially as described.

17. In a machine of the class described, the combination with a fixed supporting frame, of a block fixed on said frame and included in an electric circuit, said block being integrally provided with a metallic section contact jaw, a movable jaw shiftable on said block toward and adapted to coöperate with said first jaw, means on said frame adapted to hold a metallic section in fixed position relatively to said jaws, and means on said frame adapted to shiftably actuate said second jaw; substantially as described.

18. In a machine of the class described, a pair of coöperating jaws, a recessed block adapted to fit between and insulated from said jaws, and means adapted to actuate said jaws to clamp said block therebetween; substantially as described.

19. In a machine of the class described, a supporting frame, a jaw fixed on said frame, a second jaw slidable on said frame toward said fixed jaw, a recessed block adapted to fit between said jaws, and means adapted to actuate said movable jaw to clamp said block between said jaws; substantially as described.

20. In a machine of the class described, a fixedly mounted block provided with an integral upstanding jaw, a second jaw slidably mounted on said block and adapted to coöperate with said first jaw, a recessed member adapted to fit on said block between said jaws, and means adapted to slidably move said second jaw on said block to clamp said recessed member between said jaws; substantially as described.

21. In a machine of the class described, the combination with a fixed supporting frame, of metallic section holding means on said frame, and means arranged on said frame and comprising a plurality of spaced apart sets of contact-members included in an electric circuit and adapted to electrically engage with one end of the metallic section held by said holding means for causing an electric current to pass therethrough, the circuit therebetween being completed through said metallic section at said end thereof; substantially as described.

22. In a machine of the class described, the combination with a fixed supporting frame, of metallic section holding means on said frame, a contact jaw fixed on said frame, a contact jaw movable on said frame and adapted to coöperate with said fixed jaw, and a pair of contact-members pivotally arranged on said frame and spaced away from said jaws, said jaws and contact members being included in an electric circuit and being adapted to electrically engage with the metallic section held by said holding means for causing an electric current to pass therethrough; substantially as described.

In testimony whereof, I have signed my name to this specification, in the presence of two subscribing witnesses.

THEODORE E. CRECELIUS.

Witnesses:
RUTH PETERSON,
ZELMA D. PINCUS.